United States Patent [19]

Ito

[11] Patent Number: 4,767,588
[45] Date of Patent: Aug. 30, 1988

[54] VEHICLE CONTROL SYSTEM FOR CONTROLLING SIDE SLIP ANGLE AND YAW RATE GAIN

[75] Inventor: Ken Ito, Yokohama, Japan

[73] Assignee: Nissan Motor Co., Ltd., Japan

[21] Appl. No.: 850,665

[22] Filed: Apr. 11, 1986

[30] Foreign Application Priority Data

Apr. 13, 1985 [JP] Japan .................................. 60-77534
Apr. 15, 1985 [JP] Japan .................................. 60-78533
Apr. 15, 1985 [JP] Japan .................................. 60-78532

[51] Int. Cl.$^4$ ............................................. B62D 5/04
[52] U.S. Cl. .................................. 364/424; 180/79.1; 180/143
[58] Field of Search ............... 364/424, 425; 180/79.1, 180/132, 140–143; 280/91; 74/388 PS

[56] References Cited

U.S. PATENT DOCUMENTS

| | | | |
|---|---|---|---|
| 4,412,594 | 11/1983 | Furukawa et al. | 180/142 |
| 4,418,780 | 12/1983 | Ito et al. | 180/142 |
| 4,441,572 | 4/1984 | Ito et al. | 180/140 |
| 4,598,788 | 7/1986 | Serizawa et al. | 180/140 |
| 4,602,695 | 7/1986 | Takeshima et al. | 180/143 |
| 4,625,822 | 12/1986 | Nakamura et al. | 180/142 |
| 4,666,013 | 5/1987 | Shibahata et al. | 364/424 |

Primary Examiner—Gary Chin
Attorney, Agent, or Firm—Leydig, Voit & Mayer

[57] ABSTRACT

A control system for a controlled vehicle having front and rear wheels has a steering wheel angle sensor, a vehicle speed sensor, a controller such as a microcomputer, and an actuating system for varying actual steering gear ratio and actual rear wheel steer angle to approach desired values under command of the controller. From input quantities, the controller determines a desired steering gear ratio by using equations of motion so that a desired steady state side slip angle, and a desired steady state yaw rate gain can be obtained, and further determines a desired rear wheel steer angle by using the equations of motion so that desired response characteristics can be obtained in a steady state or in both steady and transient states.

17 Claims, 9 Drawing Sheets

VEHICLE CONTROL SYSTEM FOR CONTROLLING SIDE SLIP ANGLE AND YAW RATE GAIN

BACKGROUND OF THE INVENTION

The present invention relates to a vehicle control system for controlling the stability and control characteristics of a wheeled vehicle such as an automobile, and more specifically to a vehicle control system designed to maintain a steady state side slip angle of a center of gravity of the vehicle constant regardless of changes in vehicle speed.

The possibility of improvement in steering characteristics of a conventional two wheel steer vehicle (in which only front wheels are steered by angular displacement of a steering wheel) is limited because of the very nature of the two wheel steer vehicle.

A conventional example of a control system for a four wheel steer vehicle is disclosed in 'Gakujutsu Kō enkai Zensatsushū 842058' (pages 307-310) published by Society of Automotive Engineers of Japan in 1984. The control system of this example is arranged to maintain a steady state side slip angle $\beta$ at zero to eliminate a phase delay of a vehicle lateral acceleration by controlling a rear wheel steer angle. However, in a high vehicle speed range (over 100 km/h, for example), this system cannot attain the intended result that $\beta = 0$ without increasing the rear steer angle so much that the yaw rate gain of the vehicle decreases rapidly with increase in vehicle speed because this system is so devised as to control the side slip angle by manipulating the rear wheel angle only. Therefore, the handling characteristics obtainable by this system are unsatisfactory in that a great amount of steering is required for changing the direction of the vehicle as, for example, in changing lanes. Furthermore, this conventional control system cannot yield a stable vehicle response in a transient state which results from an input to the steering wheel until a steady state condition is reached.

SUMMARY OF THE INVENTION

It is an object of the present invention to provide a steering control system for controlling a steady state side slip angle and a steering response gain, such as a yaw rate gain, adequately by manipulating an overall steering ratio (steering gear ratio) and a rear wheel steer angle.

According to the present invention, a steering control system for a controlled vehicle, comprises a means for sensing a steering wheel angle of the controlled vehicle, a means for sensing a vehicle speed of the controlled vehicle, a means for determining a desired value of a steady state side slip angle, a means for determining a desired value of a steady state steering response gain corresponding to a sensed value of the vehicle speed in accordance with a desired steering characteristic, a means for determining a target value of an overall steering ratio corresponding to the desired value of the steady state steering response gain, the desired value of the steady state side slip angle and the sensed value of the vehicle speed in accordance with a first relation determined by actual values of vehicle parameters of the controlled vehicle, a means for determining a target value of a rear wheel steer angle corresponding to the sensed value of the vehicle speed and a sensed value of the steering wheel angle in accordance with a second relation determined by the actual values of the vehicle parameters of the controlled vehicle and the target value of the overall steering ratio, a steering ratio varying means for varying an actual overall steering ratio of the controlled vehicle so that the actual overall steering ratio remains equal to the target value of the overall steering ratio, and a rear wheel steering means for varying an actual rear wheel steer angle of the controlled vehicle so that the actual rear wheel steer angle remains equal to the target value of the rear wheel steer angle.

DETAILED DESCRIPTION OF THE INVENTION

Figure 1:
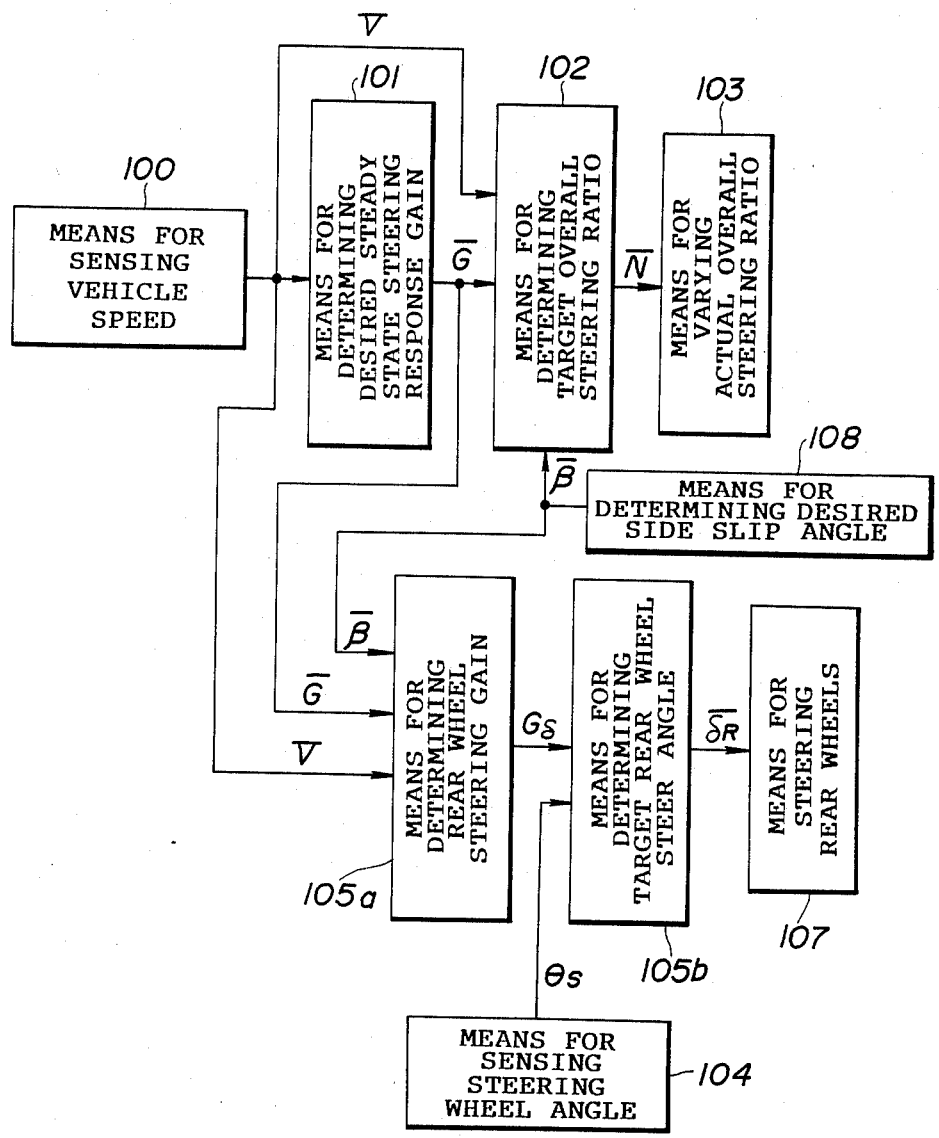
FIG. 1 is a block diagram illustrating a first embodiment of the present invention.
Figure 2:
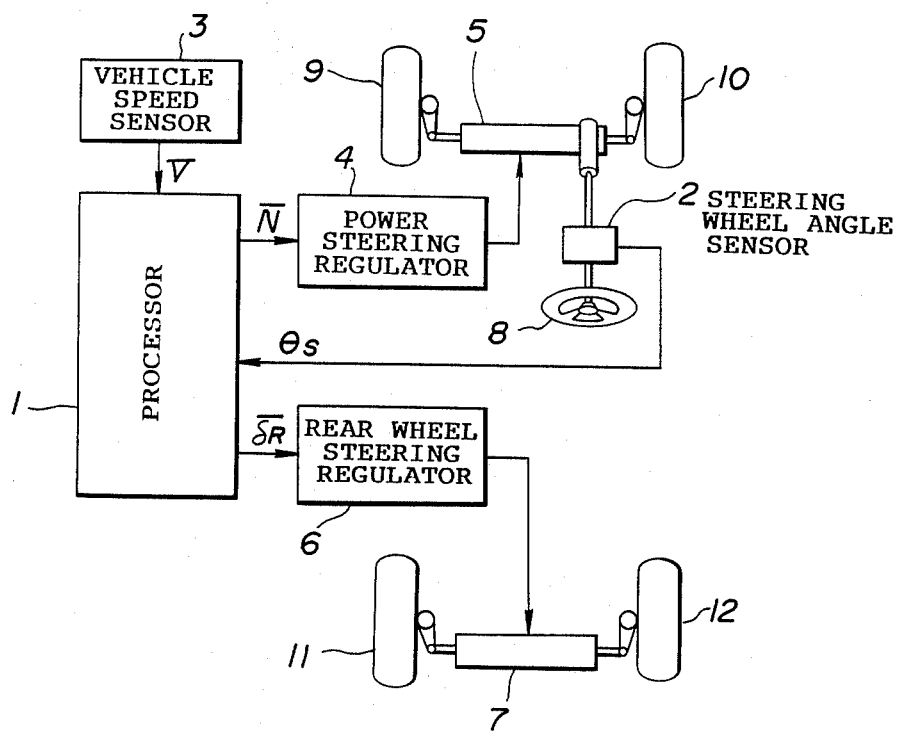
FIG. 2 is a schematic view of a steering control system of the first embodiment (or a second or third embodiment)

A first embodiment of the present invention is shown in FIGS. 1 and 2.

As shown in FIG. 1, the steering control system of the first embodiment comprises a means 100 for sensing a vehicle speed V of a controlled vehicle, a means 101 for determining a desired value $\overline{G}$ of a steady state steering resonse gain, a means 102 for determining a target value $\overline{N}$ of an overall steering ratio (or a steering gear ratio), a means 103 for varying an actual overall steering ratio of the controlled vehicle, a means 104 for sensing a steering wheel angle $\theta_s$ of the controlled vehicle, a target rear wheel steer angle determining means which has a means 105a for determining a rear wheel steering gain $G_\delta$ and a means 105b for determining a target value $\delta_R$ of a rear wheel steer angle, and a means 107 for steering rear wheels of the controlled vehicle.

As shown in FIG. 2, the means 101, 102, 105a and 105b are incorporated in a processor 1 such as a microcomputer or other electric circuitry. The vehicle speed sensing means 100 takes the form of a vehicle speed sensor 3, and the steering wheel angle sensing means 104 takes the form of a steering wheel angle sensor 2. The actual overall steering ratio varying means 103 comprises a power steering regulator 4 and a power steering unit 5. The rear wheel steering means 107 comprises a rear wheel steering regulator 6 and a rear hydraulic steering unit 7.

The processor 1 receives the steering wheel angle $\theta_s$ of a steering wheel 8 of the controlled vehicle sensed by the steering wheel angle sensor 2, and the vehicle speed V of the controlled vehicle sensed by the vehicle speed sensor 3. By processing $\theta_s$ and V, the processor 1 outputs the target value $\overline{N}$ of the overall steering ratio and the target value $\overline{\delta}_R$ of the rear wheel steer angle.

The power steering regulator 4 varies the overall steering ratio N of the controlled vehicle by controlling a hydraylic oil pressure of the power steering unit 5 for steering front wheels 9 and 10 of the controlled vehicle. The power steering regulator 4 varies the hydraulic oil pressure in accordance with the target value $\overline{N}$ of the overall steering ratio. Therefore, for any given value of the steering wheel angle $\theta_s$, the larger the target value $\overline{N}$ of the overall steering ratio is, the larger the actual front wheel steer angle $\delta_F$ becomes. One example of a device for controlling the hydraulic oil pressure of the power steering unit is disclosed in Japanese Utility Model application, provisional publication No. 59-24665. The disclosure of this document is herein incorporated by reference.

The rear wheels 11 and 12 of the controlled vehicle are steered by the hydraulic steering unit 7, which is controlled by the rear wheel steering regulator 6. The rear wheel steering regulator 6 varies the hydraulic oil pressure supplied to the rear hydraulic unit 7 in accordance with the target value $\overline{\delta}_R$ of the rear wheel steer angle determined by the processor 1 so that the actual rear wheel steer angle $\delta_R$ is maintained equal to the target value $\overline{\delta}_R$. The rear wheel steering regulator 6 and the hydraulic unit 7 are disclosed in a commonly owned, U.S. Pat. No. 4,679,809, issued on July 14, 1987, a corresponding West German patent application No. P3532247.0 filed on Sept. 10, 1985 and a corresponding Japanese application No. 59-188153 filed on Sept. 10, 1984. The disclosures of these documents are herein incorporated by reference.

Figure 3:
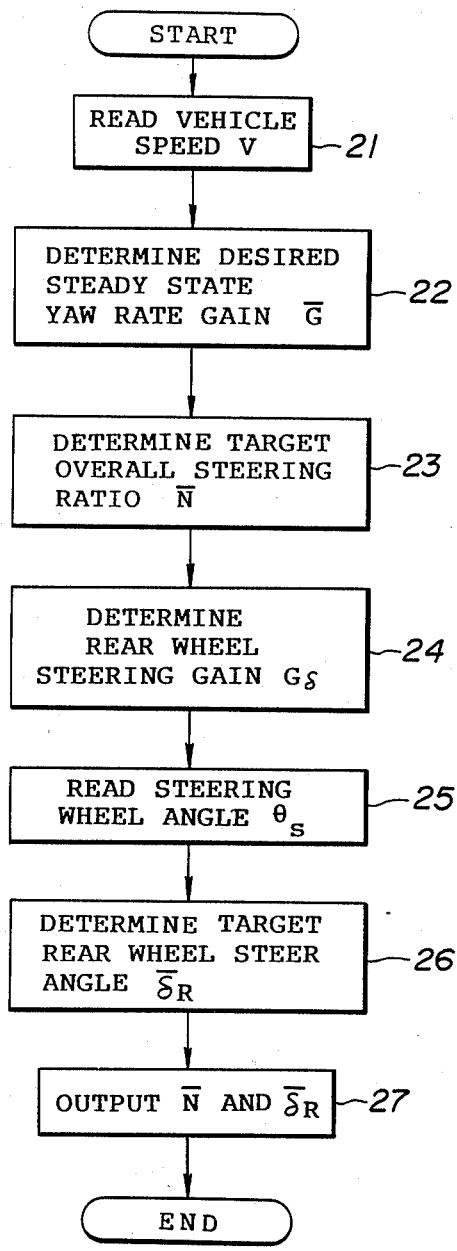
FIG. 3 is a flowchart of a program of the first embodiment.
Figure 4:
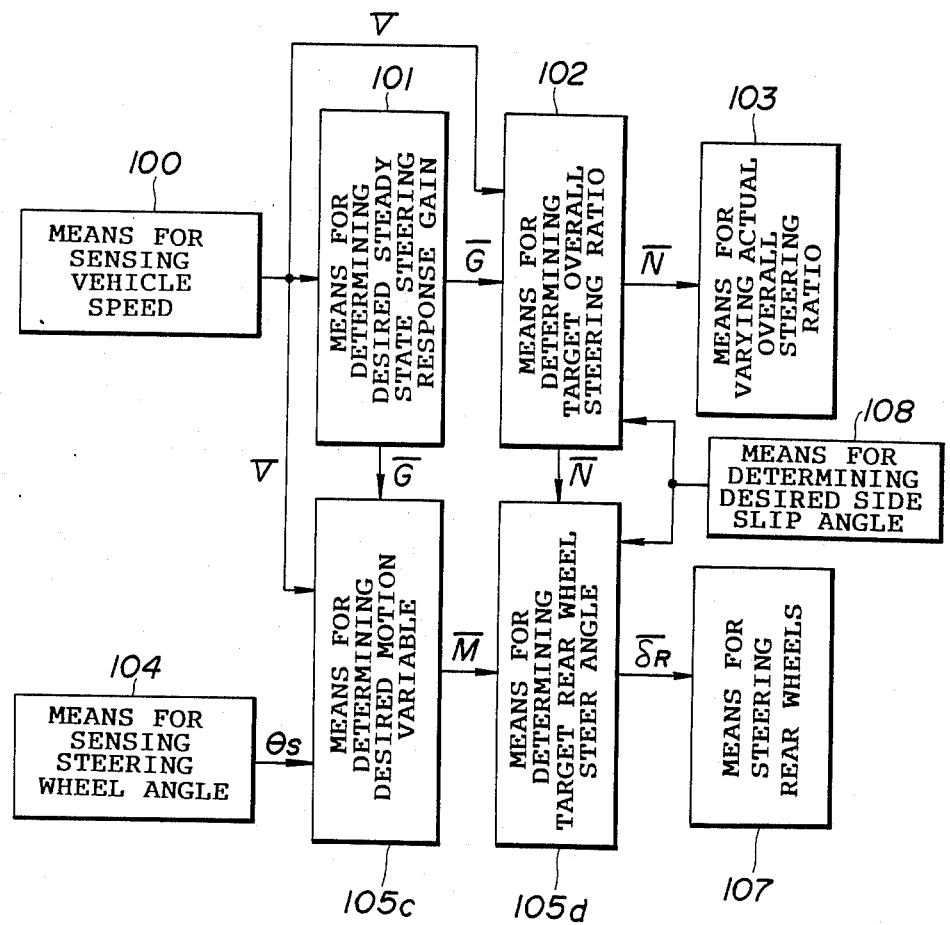
FIG. 4 is a block diagram illustrating the second embodiment of the present invention.

FIG. 3 shows a program performed repeatedly by the processor 1 of the first embodiment at regular time intervals when the processor 1 is a microcomputer.

At a step 21, the processor 1 reads the vehicle speed V sensed by the vehicle speed sensor 3. At a step 22, the processor 1 determines the desired value $\overline{G}$ of the steady state steering response gain. In this embodiment, the processor 1 determines the desired value $\overline{G}$ of the steady state yaw rate gain. The desired yaw rate gain value $\overline{G}$ is determined by use of the following equation;

$$\overline{G} = \frac{V}{(1 + A_0 V^2) N_0 L_0} \quad (1)$$

where $A_0$ is a desired stability factor of a desired vehicle having desired steering characteristics, $N_0$ is a desired overall steering ratio of the desired vehicle, and $L_0$ is a desired wheelbase of the desired vehicle. These values $A_0$, $N_0$ and $L_0$ are stored in a memory.

In general, a steady state yaw rate $\dot{\phi}_{const}$ is mathematically related to the steering wheel angle $\theta_s$ by the following equation;

$$\dot{\phi}_{const} = \frac{V}{(1 + A_1 V^2) N_1 L_1} \theta_s \quad (2)$$

where $A_1$ is a stability factor, $N_1$ is an overall steering ratio and $L_1$ is a wheelbase. Therefore, the steady state yaw rate gain given by the equation (1) is obtained by diving both sides of the equation (2) by $\theta_s$.

At a step 23, the processor 1 determines the target value $\overline{N}$ of the overall steering ratio which is required to achieve the desired value of the steady state yaw rate gain in the controlled vehicle, in accordance with the following equation;

$$\overline{N} = \left\{ \overline{G} \left( \frac{L_F}{V} + \frac{V M L_R}{2 e K_F L} \right) \right\}^{-1} \quad (3)$$

The equation (3) is obtained in the following manner.

The steady state motion of the controlled vehicle whose rear wheels are steerable, and which is assumed to have two degrees of freedom in side slipping motion and yawing motion is approximately described by the following equations of motion;

$$C_F + C_R \left( = \frac{1}{2} M \alpha \right) = \frac{1}{2} MV\dot{\phi} \quad (4)$$

$$L_F C_F = L_R C_R \quad (5)$$

$$C_F = eK_F \left( \frac{\theta_s}{N} - \beta - L_F \dot{\phi}/V \right) \quad (6)$$

$$C_R = K_R (\delta_R - \beta + L_R \dot{\phi}/V) \quad (7)$$

where the variables $C_F$, $C_R$, $\alpha$, $\beta$, $\dot{\phi}$, $\delta_R$ and vehicle parameters M, $eK_F$, $K_R$, $L_F$, $L_R$, N are defined as follows:

$C_F$ = a front wheel cornering force of the controlled vehicle, $C_R$ = a rear wheel cornering force of the controlled vehicle, $\alpha$ = a lateral acceleration of the controlled vehicle, $\beta$ = a side slip angle of the center of gravity of the controlled vehicle, $\dot{\phi}$ = a yaw rate of the controlled vehicle, $\delta_R$ = a rear wheel steer angle of the controlled vehicle, M = a vehicle mass of the controlled vehicle, $eK_F$ = a front equivalent cornering power of the controlled vehicle, $K_R$ = a rear cornering power of the controlled vehicle, $L_F$ = a distance between a front axle and the center of gravity of the controlled vehicle, $L_R$ = a distance between a rear axle and the center of gravity of the controlled vehicle, N = an overall steering ratio of the controlled vehicle.

In this embodiment, the desired value of the steady state side slip angle is always equal to zero regardless of changes in the vehicle speed. Therefore, substituting $\overline{\beta}(=0)$ into $\beta$ in the equations (6) and (7) gives;

$$C_F = eK_F \left( \frac{\theta_s}{N} - L_F \dot{\phi}/V \right) \quad (8)$$

$$C_R = K_R (\delta_R + L_R \dot{\phi}/V) \quad (9)$$

Substituting the equation (5) into the equation (4) gives;

$$\frac{1}{2} M V \dot{\phi} = \frac{L}{L_R} C_F \quad (10)$$

where L is a wheelbase of the controlled vehicle, and $L = L_F + L_R$.

Substitution of the equation (8) into the equation (10) gives;

$$\frac{1}{2} M V \dot{\phi} = \frac{L}{L_R} eK_F \left( \frac{\theta_s}{N} - L_F \dot{\phi}/V \right) \quad (11)$$

Rearrangement of the equation (11) results in;

$$N = \left( \frac{L_F}{V} + \frac{V M L_R}{2 eK_F L} \right)^{-1} \frac{\theta_s}{\dot{\phi}} \quad (12)$$

The quantity $\dot{\phi}/\theta_s$ is the steady yaw rate gain. Therefore, the equation (3) is obtained by substituting the desired steady state yaw rate gain value $\overline{G}$ into the equation (12).

Thus, the target overall steering ratio value $\overline{N}$ is so determined as to achieve the desired steady state yaw rate gain value $\overline{G}$ and the desired side slip angle value $\overline{\beta}$ in the controlled vehicle.

At a step 24, the processor 1 of the first embodiment determines the rear wheel steering gain $G_\delta$ by use of the following equation;

$$G_\delta = \left( \frac{ML_F V}{2LK_R} - \frac{L_F}{V} \right) \overline{G} \quad (13)$$

The equation (13) is obtained in the following manner.

Substitution of the equation (9) into the equation (10) yields;

$$\frac{1}{2} MV\dot{\phi} = \frac{L}{L_F} K_F (\delta_R + L_R \dot{\phi}/V) \quad (14)$$

From the equation (14), $$\delta_R = \left( \frac{ML_F V}{2K_R L} - \frac{L_R}{V} \right) \dot{\phi} \quad (15)$$

Division of both members of the equation (15) by $\theta_s$ yields;

$$\frac{\delta_R}{\theta_s} = \left( \frac{ML_F V}{2K_R L} - \frac{L_R}{V} \right) \frac{\dot{\phi}}{\theta_s} \quad (16)$$

In the equation (16), $\delta_R/\theta_s$ is the rear wheel steering gain, and $\dot{\phi}/\theta_s$ is the steady state yaw rate gain. Therefore, the equation (13) is obtained by substituting $G_\delta$ and $\overline{G}$, respectively into $\delta_R/\theta_s$ and $\dot{\phi}/\theta_s$ in the equation (16).

The thus-determined rear wheel steering gain $G_\delta$ is the value for achieving the above-mentioned desired steering characteristic and the desired side slip angle value $\overline{\beta}$.

At a step 25, the processor 1 reads the steering wheel angle $\theta_s$ sensed by the steering wheel angle sensor 2. At a step 26, the processor 1 determines the target value $\delta_R$ of the rear wheel steer angle, from the steering wheel angle $\theta_s$ obtained at the step 25 and the rear wheel steering gain $G_\delta$ obtained at the step 24, by use of the following equation;

$$\overline{\delta}_R = G_\delta \theta_s \quad (17)$$

At a step 27, the processor 1 delivers the signal representing the target overall steering ratio value $\overline{N}$ to the power steering regulator 4, and the signal representing the target rear wheel steer angle value $\overline{\delta}_R$ to the rear wheel steering regulator 6.

In response to the signal from the processor 1, the power steering regulator 4 controls the oil pressure of the power steering unit 5 so that the actual overall steering ratio N of the controlled vehicle is held equal to the target overall steering ratio value $\overline{N}$. The rear wheel steering regulator 6 controls the oil pressure supplied to the hydraulic rear wheel steering unit 7 in accordance with the target rear wheel steer angle $\overline{\delta}_R$ so that the actual rear wheel steer angle of the controlled vehicle is held equal to the target rear wheel steer angle value $\overline{\delta}_R$.

The steering control system of the first embodiment controls not only the rear wheel steer angle but also the overall steering ratio so as to make the controlled vehicle have the desired steering characteristic, and to hold the actual steady state side slip angle of the controlled vehicle equal to the desired side slip angle value. Therefore, the control system of the first embodiment can achieve the desired side slip angle without increasing the steering amount of the rear wheels excessively. As a result, this control system can prevent the yaw rate gain from decreasing in the high speed range.

It is optional to determine any one or more of the target overall steering ratio value $\overline{N}$, the rear wheel steering gain $G_\delta$ and the desired steady state yaw rate gain $\overline{G}$ by use of table lockup.

A second embodiment of the present invention is shown in FIGS. 4 to 8. The control system of the second embodiment is different from the system of the first embodiment only in that the rear wheel steering gain determining means 105a and the target rear wheel steer angle determining means 105b shown in FIG. 1 are replaced by a target rear wheel steer angle determining means having a means 105c for determining one or more desired motion variables and a means 105d for determining the target rear wheel angle. FIG. 2 is common to the first embodiment and the second embodiment.

Figure 5:
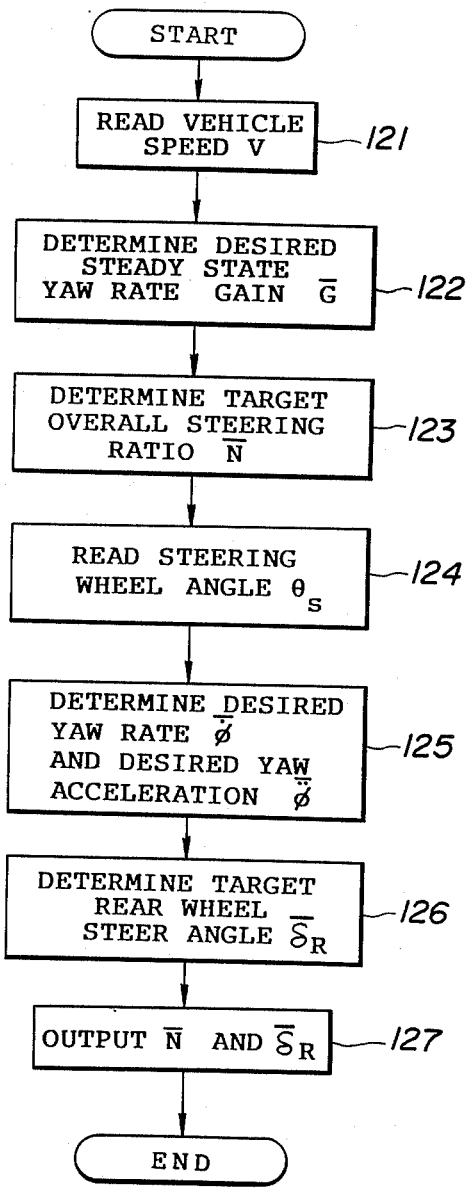
FIG. 5 is a flowchart of a program of the second embodiment.

FIG. 5 shows a program performed by the processor 1 of the second embodiment when it is a microcomputer.

Steps 121, 122 and 123 of FIG. 5 are identical to the steps 21, 22 and 23 of FIG. 3, respectively. The processor 1 of the second embodiment determines the desired steady state yaw rate gain value $\overline{G}$ by use of the equation (1) at the step 122, and the target overall steering ratio value $\overline{N}$ by use of the equation (3).

At a step 124, the processor 1 reads the steering wheel angle $\theta_s$ sensed by the steering wheel angle sensor 2 shown in FIG. 2.

At a step 125, the processor 1 of the second embodiment determines desired values of vehicle motion variables corresponding to the steering wheel angle $\theta_s$ sensed by the steering wheel angle sensor 2 and the vehicle speed V sensed by the vehicle speed sensor 3, by use of a desired simulation model representing a desired vehicle having desired cornering characteristics. In the second embodiment, the processor 1 determines the desired value $\dot{\phi}$ the yaw rate and the desired value $\ddot{\phi}$ of the yaw acceleration.

The desired simulation model is determined by equations of vehicle motion and values of vehicle parameters. With the model, it is possible to predict a behavior of the desired vehicle simulated by the model, resulting from given values of the steering wheel angle $\theta_s$ and the vehicle speed V.

The desired model is so chosen that the desired vehicle simulated by the model has the same desired steering characteristic as used in the step 122 for determining the desired steady state yaw rate gain $\overline{G}$.

At the step 125, the processor 1 determines the desired yaw rate value $\overline{\phi}$ and the desired yaw accleration value $\overline{\dot{\phi}}$ by use of the following equations:

$$N_1 = N_0(1 + A_0V^2) \quad (18)$$

$$M_1(\dot{V}_{y1} + \dot{\phi}_1 V) = 2C_{F1} + 2C_{R1} \quad (19)$$

$$I_{Z1}\dot{\phi}_1 = 2L_{F1}C_{F1} - 2L_{R1}C_{R1} \quad (20)$$

$$\beta_{F1} = \frac{\theta_s}{N_1} - (V_{y1} + L_{F1}\dot{\phi}_1)/V \quad (21)$$

$$\beta_{R1} = -(V_{y1} - L_{R1}\dot{\phi}_1)/V \quad (22)$$

$$C_{F1} = K_{F1}\beta_{F1} \quad (23)$$

$$C_{R1} = K_{R1}\beta_{R1} \quad (24)$$

$$\overline{\phi} = \phi_1 \quad (25)$$

$$\overline{\dot{\phi}} = \dot{\phi}_1 \quad (26)$$

$$L_{F1} + L_{R1} = L_0 \quad (27)$$

where the vehicle parameters $N_1$, $M_1$, $I_{Z1}$, $L_{F1}$, $L_{R1}$ and variables $V_{y1}$, $\dot{V}_{y1}$, $\beta_{F1}$, $\beta_{R1}$, $C_{F1}$, $C_{R1}$, $\phi_1$ and $\dot{\phi}_1$ are defined as follows:
(vehicle parameters are;)
$N_1$=an overall steering ratio of the desired vehicle,
$M_1$=a vehicle mass of the desired vehicle,
$I_{Z1}$=a yawing moment of inertia of the desired vehicle,
$L_{F1}$=a distance between a front axle and a center of gravity of the desired vehicle,
$L_{R1}$=a distance between a rear axle and the center of gravity of the desired vehicle,
(, and variables are;)
$V_{y1}$=a side speed of the desired vehicle,
$\dot{V}_{y1}$=a side acceleration of the desired vehicle,
$\beta_{F1}$=a front wheel side slip angle of the desired vehicle,
$\beta_{R1}$=a rear wheel side slip angle of the desired vehicle,
$C_{F1}$=a front wheel cornering force of the desired vehicle,
$C_{R1}$=a rear wheel cornering force of the desired vehicle,
$\phi_1$=a yaw rate of the desired vehicle,
$\dot{\phi}_1$=a yaw acceleration of the desired vehicle.

As expressed by the equations (25) and (26), the desired yaw rate value $\overline{\phi}$ is the value of the yaw rate of the desired vehicle, and the desired yaw acceleration value $\overline{\dot{\phi}}$ is the value of the yaw acceleration of the desired vehicle. The equations (18) and (27) are introduced to match the steering characteristic of the desired vehicle model to the desired steering characteristic used for determining the desired overall steering ratio value $\overline{N}$.

At a step 126, the processor 1 of the second embodiment determines a target value $\overline{\delta}_R$ of the rear wheel steer angle which is required to achieve the desired yaw rate value $\overline{\phi}$ and the desired yaw acceleration value $\overline{\dot{\phi}}$ in the controlled vehicle.

In determining the target rear wheel steer angle $\overline{\delta}_R$, the target overall steering ratio value $\overline{N}$ and the above-mentioned front equivalent cornering power $eK_F$ are used in order to make the steering characteristic of the controlled vehicle identical to the desired steering characteristic used for determining the target overall steering ratio value $\overline{N}$. Furthermore, the vehicle parameters of the controlled vehicle used for determining the target overall steering ratio $\overline{N}$ are also used at the step 126.

The processor 1 of the second embodiment determines the target rear wheel steer angle value $\overline{\delta}_R$ by use of the following equations.

$$M(\dot{V}_y - \overline{\phi}V) = 2C_F + 2C_R \quad (28)$$

$$\beta_F = \frac{\theta_s}{\overline{N}} - (V_y + L_F\overline{\phi})/V \quad (29)$$

$$C_F = eK_F\beta_F \quad (30)$$

$$C_R = \left(L_FC_F - \frac{1}{2}\overline{\dot{\phi}}I_Z\right)/L_R \quad (31)$$

$$\beta_R = C_R/K_R \quad (32)$$

$$\overline{\delta}_R = \beta_R + (V_y - L_R\overline{\phi})/V \quad (33)$$

$$K_F = K_R, L_F = L_R \quad (34)$$

In the equations (28)–(34), the vehicle parameter $I_Z$ and motion variables $V_y$, $\dot{V}_y$, $\beta_F$, $\beta_R$, $C_F$, and $C_R$ of the controlled vehicle are used in addition to the vehicle parameters M, $L_F$, $L_R$, $eK_F$ and $K_R$ used for determining the target overall steering ratio $\overline{N}$;
$I_Z$=a yawing moment of inertia of the controlled vehicle,
$V_y$=a side speed of the controlled vehicle,
$\dot{V}_y$=a side acceleration of the controlled vehicle,
$\beta_F$=a front wheel side slip angle of the controlled vehicle,
$\beta_R$=a rear wheel side slip angle of the controlled vehicle,
$C_F$=a front wheel cornering force of the controlled vehicle,
$C_R$=a rear wheel cornering force of the controlled vehicle.

At the step 126, the target rear wheel steer angle value $\overline{\delta}_R$ is determined by using the target overall steering ratio value $\overline{N}$ which is so determined as to invest the controlled vehicle with the desired steering characteristic, and to satisfy the requirement that the steady state side slip angle is equal to the desired value $\overline{\beta}$ (=0). Therefore, the target rear wheel steer angle value $\overline{\delta}_R$ is the value intended to achieve not only the desired yaw rate value $\overline{\phi}$ and the desired yaw acceleration value $\overline{\dot{\phi}}$ but also the desired steady state side slip angle $\overline{\beta}$ in the controlled vehicle.

At a step 127, the processor 1 delivers the signals representing the target overall steering ratio value $\overline{N}$ determined at the step 123, and the target rear wheel steer angle value $\overline{\delta}_R$ determined at the step 126 to the power steering regulator 4 and the rear wheel steering regulator 6, respectively.

Figure 6:
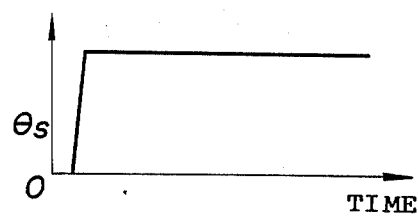
FIGS. 6, 7 and 8 are graphs showing response characteristics of a controlled vehicle of the second embodiment.
Figure 7:
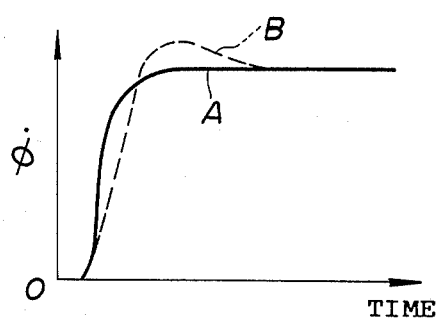
Figure 8:
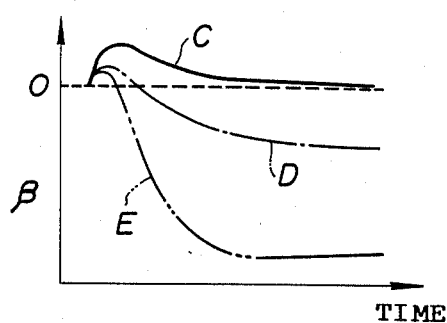
Figure 9:
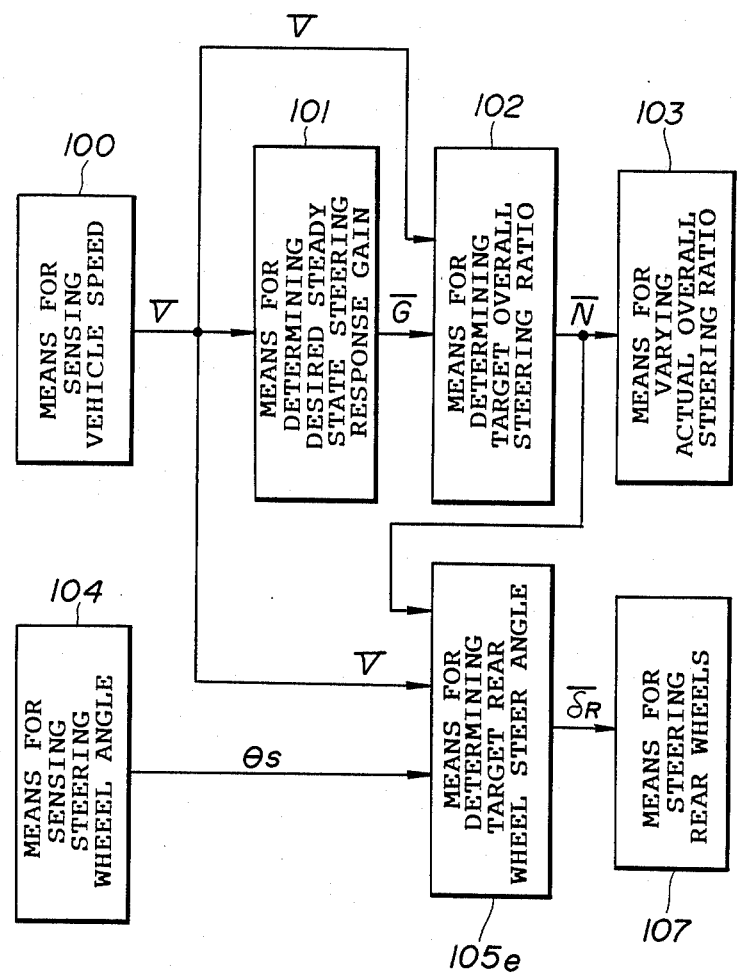
FIG. 9 is a block diagram illustrating the third embodiment of the present invention.

FIGS. 6, 7 and 8 show time responses (or dynamic responses) of the controlled vehicle controlled by the system of the second embodiment. FIGS. 7 and 8 show, respectively, the yaw rate $\phi 0$ and the side slip angle $\beta$ of the center of gavity of the controlled vehicle, expressed as a function of time, resulting from a step change in input to the steering wheel 8 of the controlled vehicle shown in FIG. 6.

A solid line A in FIG. 7 shows the yaw rate characteristic of the controlled vehicle equipped with the system of the second embodiment. A broken line B is a yaw rate characteristic of an imaginary vehicle when it is assumed that only the overall steering ratio is controlled in the imaginary vehicle. As is known from FIG. 7, the control system of the second embodiment can make the behavior of the controlled vehicle stable (nonoscillatory) in both of steady state and transient state (by choosing the desired steering characteristic appropriately). In contrast to this, it is not possible to obtain a stable yaw rate characteristic by controlling only the overall steering ratio because the control of the transient state motion is insufficient.

As shown by a solid line C in FIG. 8, the controlled vehicle of the second embodiment achieves the desired side slip angle $\bar{\beta}$ ($=0$) faithfully during the steady state turning motion. In the case of the above-mentioned imaginary vehicle equipped with the control system for controlling only the overall steering ratio, as shown by a two-dot chain line E, the side slip angle is nearly uncontrollable. A one-dot chain line D shows a characteristic of the conventional vehicle which is arranged to achieve the desired steady state side slip angle by controlling only the rear wheel steer angle. In this case, the control performance of the steady state side slip angle is deteriorated as shown by the line D because importance is attached to te stability of the yaw rate.

The control system of the second embodiment can cause the controlled vehicle to obtain the desired characteristics in both steady state and transient state regardless of variation of the vehicle speed. Furthermore, the control system of the second embodiment can improve the controllability of the controlled vehicle by preventing the yaw rate gain from decreasing in the high vehicle speed range in the same manner as in the first embodiment.

A third embodiment of the present invention is shown in FIGS. 9-14. The steering control system of the third embodiment is different from the systems of the preceding embodiments only in a target rear wheel steer angle determining means 105e shown in FIG. 9. FIG. 2 is also applicable to the third embodiment.

Figure 10:
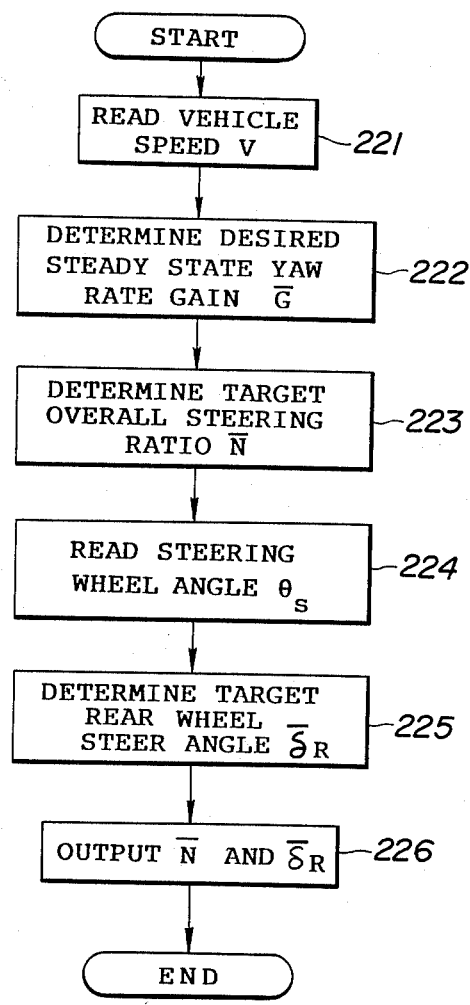
FIG. 10 is a flowchart of a program of the third embodiment.

FIG. 10 shows a program performed by the processor 1 of the third embodiment. Steps 221, 222, 223, 224 and 226 are identical to the steps 121, 122, 123, 124, and 127 of FIG. 5. That is, the processor 1 of the third embodiment determines the desired steady state yaw rate gain value $\bar{G}$ by use of the equation (1) at the step 222, and the target overall steering ratio value $\bar{N}$ by use of the equation (3) at the step 223. The program of FIG. 10 is different from the programs of the preceding embodiments only in a step 225.

At the step 225, the processor 1 performs mathematical operations to determine the target rear wheel steer angle value $\bar{\delta}_R$ for achieving the desired steering characteristic, that is, the desired steady state yaw rate gain value $\bar{G}$. At the step 225, the target rear wheel steer angle value corresponding to the steering wheel angle $\theta_s$ obtained at the step 224 and the vehicle speed v obtained at the step 221 is determined by using the target overall steering ratio value $\bar{N}$ obtained on the basis of the desired steady state yaw rate gain value $\bar{G}$, and the vehicle parameters such as M, $L_F$, $L_R$, $eK_F$ and $K_R$ of the controlled vehicle used in determining the target overall steering ratio value $\bar{N}$ at the step 223. Furthermore, the target rear wheel steer angle value $\bar{\delta}_R$ of the third embodiment is determined so that a side slip angular velocity $\dot{\beta}$ of the center of gravity always remains equal to zero.

The following equations are used at the step 225;

$$I_Z \ddot{\phi} = 2L_F C_F - 2L_R C_R \qquad (35)$$

$$\beta_F = \frac{\theta_s}{N} - L_F \dot{\phi}/V \qquad (36)$$

$$C_F = eK_F \beta_F \qquad (37)$$

$$\bar{\alpha} = V\dot{\phi} \ (\dot{\beta} = 0) \qquad (38)$$

$$C_R = M\bar{\alpha}/2 - C_F \qquad (39)$$

$$\beta_R = C_R/K_R \qquad (40)$$

$$\bar{\delta}_R = \beta_R - L_R\dot{\phi}/V \qquad (41)$$

In these equations, $\ddot{\phi}$ is the yaw acceleration of the controlled vehicle, $I_Z$ is the yawing moment of inertia of the controlled vehicle, and $\bar{\alpha}$ is a desired value of a lateral acceleration.

In the third embodiment, the equation (38) is introduced in order to satisfy the requirement that the side slip angular velocity $\dot{\beta}$ should be always equal to zero. In general, a vehicle lateral acceleration $\alpha$ is expressed by;

$$\alpha = V\dot{\phi} + \dot{V}_y = V(\dot{\phi} + \dot{\beta}) \qquad (42)$$

The equation (38) is obtained by substituting $\dot{\beta}=0$ into the equation (42). The desired lateral acceleration value $\bar{\alpha}$ is the value for achieving $\dot{\beta}=0$. The desired value $\bar{\alpha}$ of the lateral acceleration affects the equations (39), (40) and (41), so that the target rear wheel steer angle value $\bar{\delta}_R$ of the third embodiment is the value intended to achieve the desired lateral acceleration $\bar{\alpha}$, that is, the desired side slip angular velocity $\dot{\beta}=0$.

In this way, the control system of the third embodiment can let the controlled vehicle achieve the desired steering characteristic (the desired steady state yaw rate gain) and the desired side slip angle ($\beta=0$), by controlling both of the overall steering ratio and the rear wheel steer angle. In the transient state in which it is difficult to control the vehicle motion by manipulating only the overall steering ratio, the control system of the third embodiment can bring about the desired characteristics and fulfil the requirement that the side slip angular speed $\dot{\beta}=0$, by manipulating the rear wheel steer angle simultaneously with the overall steering ratio. If the side slip angular speed equals zero, then the side slip angle necessarily equals zero. Therefore, the side slip angle $\beta$ of the center of gravity of the controlled vehicle of the third embodiment is always maintained at zero in both steady state turning motion and transient motion.

Figure 11:
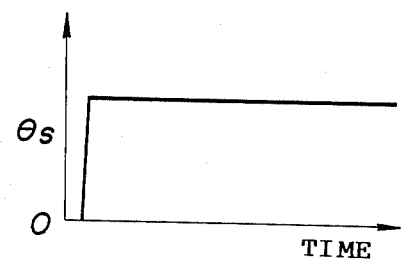
FIGS. 11, 12, 13 and 14 are graphs showing response characteristics of a controlled vehicle of the third embodiment.
Figure 13:
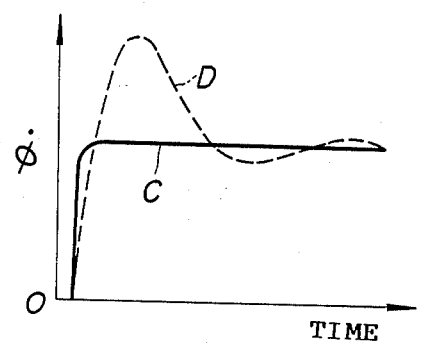
Figure 12:
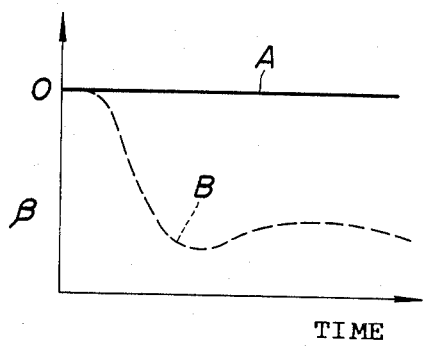
Figure 14:
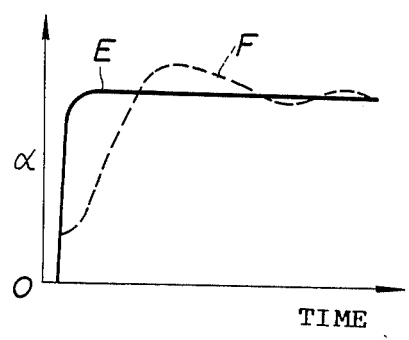

FIGS. 12, 13 and 14 show time responses of the actual side slip angle $\beta$ of the center of gravity, the actual yaw rate $\dot{\phi}$ and the actual lateral acceleration $\alpha$ of the controlled vehicle of the third embodiment when the controlled vehicle is subjected to a step change in the steering wheel angle $\theta_s$ shown in FIG. 11.

In FIG. 12, a solid line A shows a side slip angle characteristic obtained by the controlled vehicle of the third embodiment, and a broken line B shows a characteristic obtained by the imaginary vehicle in which only the steering ratio is controlled. The controlled vehicle can always achieve the desired side slip angle $\beta=0$ in an almost ideal manner whereas the characteristic of the broken line B is far from the desired result.

As shown by a solid line C in FIG. 13 and a solid line E in FIG. 14, both of the response of the yaw rate $\phi$ and the response of the lateral acceleration $\alpha$ of the controlled vehicle are stable in both transient state and steady state. The imaginary vehicle exhibits a yaw rate response shown by a broken line D and a lateral acceleration response shown by a broken line F, which are both unstable.

In the first, second and third embodiments, the vehicle parameters are fixed. (For example, the vehicle parameters are set equal to constant values determined at the time of shipment.) However, it is optional to adjust one or more of the vehicle parameters in accordance with vehicle operating conditions to achieve the desired characteristics more accurately. For example, the front equivalent cornering power $eK_F$ may be adjusted in accordance with change in overall steering ratio. The front and rear wheel cornering powers $K_F$ and $K_R$ may be adjusted in accordance with change in road surface conditions and/or wear of tires.

What is claimed is:

1. A steering control system for a controlled vehicle, comprising:
   means for sensing a steering wheel angle of said controlled vehicle,
   means for sensing a vehicle speed of the controlled vehicle,
   means for determining a desired value of a steady state steering response gain corresponding to a sensed value of the vehicle speed in accordance with a desired steering characteristic,
   means for determining a target value of an overall steering ratio between the steering wheel angle and a front wheel steer angle corresponding to the desired value of the steady state steering response gain, a predetermined desired value of a steady state side slip angle and the sensed value of the vehicle speed in accordance with a first relation determined by values of parameters characterizing the controlled vehicle,
   means for determining a target value of a rear wheel steer angle corresponding to the sensed value of the vehicle speed and a sensed value of the steering wheel angle in accordance with a second relation determined by the values of the parameters characterizing said controlled vehicle and said target value of the overall steering ratio,
   steering ratio varying means for varying an actual overall steering ratio of the controlled vehicle so that the actual overall steering ratio remains equal to the target value of the overall steering ratio, and
   rear wheel steering means for varying an actual rear wheel steering angle of the controlled vehicle so that the actual rear wheel steer angle remains equal to the target value of the rear wheel steer angle.

2. A system according to claim 1 wherein the first relation for determining said target value of the overall steering ratio is derived from equations of motion of the controlled vehicle defining yawing motion and side slipping motion in a steady state condition, and the second relation for determining the target value of said rear wheel steer angle is derived from equations of motion of the controlled vehicle defining yawing motion and side slipping motion, and a desired constraint condition.

3. A system according to claim 2 wherein the steady state steering response gain is a steady state yaw rate gain, and said desired steady state steering response gain determining means determines the desired value of the steady state yaw rate gain in accordance with the following equation:

$$\overline{G} = \frac{V}{(1 + A_0 V^2) N_0 L_0}$$

where $\overline{G}$ is the desired value of the steady state yaw rate gain, V is the sensed value of the vehicle speed, $A_0$ is a desired value of a vehicle's stability factor, $N_0$ is a desired value of the overall steering ratio, and $L_0$ is a desired value of a wheelbase.

4. A system according to claim 3 wherein said desired value of the steady state side slip angle is equal to zero.

5. A system according to claim 4 wherein said target overall steering ratio determining means determines the target value of the overall steering ratio in accordance with the following equation:

$$\overline{N} = \left\{ \overline{G} \left( \frac{L_F}{V} + \frac{VML_R}{2eK_FL} \right) \right\}^{-1}$$

where $\overline{N}$ is the target value of the overall steering ratio, M is an actual value of a vehicle mass of the controlled vehicle, $L_F$ is an actual value of a distance between a front axle and a center of gravity of said controlled vehicle, $L_R$ is an actual value of a distance between a rear axle and the center of gravity of said controlled vehicle, L is an actual value of a wheelbase of said controlled vehicle, $eK_F$ is an actual value of a front equivalent cornering power of said controlled vehicle.

6. A system according to claim 2 wherein said target rear wheel steer angle determining means determines the target value of the rear wheel steer angle in such a manner as to satisfy both of a first condition that the steady state steering response gain equals the desired value of the steady state steering response gain, and a second condition that the steady state side slip angle equals the desired value of the steady state side slip angle.

7. A system according to claim 6 wherein said target rear wheel steer angle determining means determines the target value of the rear wheel steer angle in accordance with the following equation;

$$\overline{\delta}_R = \left( \frac{ML_FV}{2LK_R} - \frac{L_F}{V} \right) \overline{G} \theta_s$$

where $\overline{\delta}_R$ is said target value of the rear wheel steer angle, M is an actual value of a vehicle mass of the controlled vehicle, $L_F$ is an actual value of a distance between a front axle and a center of gravity of the cotnrolled vehicle, L is an actual value of a wheelbase of the controlled vehicle, $L_R$ is an actual value of a rear cornering power of the controlled vehicle, V is the sensed value of the vehicle speed, $\overline{G}$ is the desired value of the steady state steering response gain, and $\theta_s$ is the sensed value of the steering wheel angle.

8. A system according to claim 2 wherein said target rare wheel steer angle determining means determines at least one desired value of a vehicle motion variable corresponding to the sensed value of the steering wheel angle and the sensed value of the vehicle speed in accordance with equations of motion of a desired vehicle whose steering characteristic is in agreement with the target value of said rear wheel steer angle so as to satisfy a condition that the vehicle motion variable of said controlled vehicle equals the desired value of said vehicle motion variable and a condition that said steady state side slip angle of the controlled vehicle equals the desired value of said steady state side slip angle.

9. A system according to claim 8 wherein said target rear wheel steer angle determining means determines desired values of yaw rate and yaw acceleration in accordance with the equations of motion of said desired vehicle.

10. A system according to claim 1 wherein said desired value of the steady state side slip angle is equal to zero, and said target rear wheel steer angle determining means determines the target value of the rear wheel steer angle so as to maintain a side slip angular speed of the center of gravity of controlled vehicle approximately equal to zero.

11. A system according to claim 1 wherein said desired steady state steering response gain determining means stores desired values of vehicle parameters representative of a desired vehicle having the desired steering characteristic, and determines the desired value of said steady state steering response gain by solving a mathematical equation relating the steady state steering response gain and the vehicle speed, based on the desired values of the vehicle parameters representative of the desired vehicle.

12. A system according to claim 11 wherein said target overall steering ratio determining means produces an electric signal representing the target value of the overall steering ratio,, and sends said electric signal to said steering ratio varying means.

13. A system according to claim 12 wherein said target rear wheel steer angle determining means comprises means for determining a target value of a rear wheel steering gain, by which the sensed value of the steering wheel angle is multiplied to determine the target value of the rear wheel steer angle, said gain is determined by solving a mathematical equation relating the rear wheel steering gain, the steady state steering response gain, actual values of the vehicle parameters of the controlled vehicle, the desired value of the steady state side slip angle, the sensed value of the vehicle speed, and the desired value of the steady state steering response gain.

14. A system according to claim 1 wherein the target rear wheel steer angle determining means comprises first calculating means for solving a first group of equations of vehicle motion, including at least one differential equation, relating actual values of the vehicle parameters of the controlled vehicle, desired value of at least one vehicle motion variable, the sensed values of the steering wheel angle and vehicle speed, and the target value of the overall steering ratio.

15. A system according to claim 14 wherein said target rear wheel steer angle determining means comprises a second calculating means for determining the desired value of at least one vehicle motion variable by solving a second group of equations of vehicle motion which include at least one differential equation, the desired values of the vehicle parameters representative of the desired vehicle, and the sensed values of the steering wheel angle and vehicle speed.

16. A system according to claim 15 wherein said second calculating means determines desired values of yaw rate and yaw acceleration by solving the second group of equations, and said first calculating means determines the target value of the rear wheel steer angle by solving the first group of equations which relate rear wheel steer angle to the desired values of the yaw rate and the yaw acceleration.

17. A system according to claim 14 wherein the desired value of the steady state side slip angle is zero, and in the first group of equations, the side slip angular speed of a vehicle center of gravity is zero.

* * * * *